United States Patent Office 3,728,259
Patented Apr. 17, 1973

3,728,259
COMPOSITION FOR DRILLING WELLS AND
METHOD FOR PREPARING SAME
Stanley A. Christman, Los Angeles, Calif., assignor to
Esso Production Research Company
No Drawing. Original application May 27, 1970, Ser. No.
41,657, now Patent No. 3,633,689. Divided and this
application July 7, 1971, Ser. No. 160,555
Int. Cl. C10m 3/22; E21b 21/04
U.S. Cl. 252—8.5 C                                13 Claims

ABSTRACT OF THE DISCLOSURE

Drilling of wells in sub-freezing environments is conducted by using a fluid which contains a major amount of an aqueous medium such as sea water or fresh water, a heteropolysaccharide produced by the action of bacteria of the genus Xanthomonas, an oxygenated hydrocarbon dispersant which may be a polyhydric alcohol such as ethylene glycol and, optionally, an alkaline medium to provide a desired pH, the polyhydric alcohol aiding in the dispersion of the heteropolysaccharide in the aqueous medium and acting as a freezing point depressant of the drilling fluid.

CROSS REFERENCE TO RELATED APPLICATION

This application is a division of application Ser. No. 41,657, filed May 27, 1970, for Stanley A. Christman, now Pat. No. 3,633,689, entitled "Method for Drilling Wells."

BACKGROUND OF THE INVENTION

(1) Field of the invention

The present invention is primarily directed to fluids for use in wells such as oil and gas wells where sub-freezing conditions are encountered. More particularly, the invention is directed to a composition useful in Arctic and other sub-freezing environments, a method of preparing the fluid, and a method for drilling a well with a fluid in sub-freezing environments. In its more specific aspects, the invention is concerned with an aqueous fluid containing dispersed therein a heteropolysaccharide produced by the action of bacteria of the genus Xanthomonas and an oxygenated hydrocarbon dispersant, which resulting fluid has a reduced freezing point.

(2) The prior art

It has been known heretofore to use heteropolysacchradies in drilling muds. It has also been known to use these materials which have been cross-linked with a polyvalent metal cation. Drilling operations have been conducted in the Artic with drilling fluids containing heteropolysaccharides. While these operations are improved to some extent by use of the heteropolysaccharides, due to the environment, such as sub-freezing atmospheric temperatures and permafrost, even use of the heteropolysaccharide-containing muds present problems since it may be necessary and/or desirable to use the resulting fluid at a temperature below its normal freezing point. Heretofore, it has been known that the addition of an inorganic salt, such as sodium chloride, may reduce the freezing point of a drilling fluid, but problems result from difficulty in dissolving the salt into a cold aqueous medium, from limited freezing point depression, and from other adverse effects of the salt on the drilling operation. Moreover, dispersion of the heteropolysaccharides into the aqueous medium is often troublesome because the hydrophilic nature of heteropolysaccharides may cause lumping which inhibits dispersion.

However, the difficulties encountered in making up the heteropolysaccharide-containing fluids are substantially and unobviously overcome or mitigated since it has been surprisingly discovered that an oxygenated hydrocarbon dispersant such as a polyhydric alcohol may be used as a slurrying or dispersing agent in making up the fluid, and furthermore the polyhydric alcohol also acts as a freezing point depressant in the fluid which prevents the fluid from freezing when used in such hostile environments or under such extreme sub-freezing temperature conditions. Thus, the polyhydric alcohol performs two functions in heteropolysaccharide-containing aqueous fluids.

SUMMARY OF THE INVENTION

The present invention may be briefly described and summarized as a fluid suitable for use in drilling oil and gas wells and particularly oil and gas wells in sub-freezing environments such as in the Arctic; the fluid comprising a major amount of an aqueous medium which may be salt water, brine, fresh water, or a suspension of colloidal particles in water such as drilling mud. The fluid contains an amount of a heteropolysaccharide produced by the action of bacteria of the genus Xanthomonas on a carbohydrate within the range of about 0.05 to about 5% by wt. of the aqueous medium. Also, the fluid contains an amount of an oxygenated hydrocarbon dispersant within the range of about 1.0 to about 30% by wt. of the aqueous medium and a sufficient amount of an alkaline medium to provide a pH on the fluid within the range of about 8 to about 10.

The invention also may be briefly described and summarized as a method of preparing the fluid in which the amount stated of the heteropolysaccharide produced by the action of the bacteria of the genus Xanthomonas on a carbohydrate is added to the stated amount of oxygenated dispersant; the amounts of oxygenated dispersant and heteropolysaccharide are agitated for a sufficient time within the range of about 0.25 to about 5 minutes to form a slurry or dispersion of the heteropolysaccharide and the oxygenated dispersant. The slurry is then mixed with the aqueous medium and the same is agitated for a time within the range of about 15 to 45 minutes to disperse the slurry in the aqueous medium. If desired, the heteropolysaccharide may be further dispersed by the addition of a sufficient amount of an alkaline medium to provide a pH within the range of about 8 to about 10.

The invention may aslo be described and summarized as embodying a method of drilling a well, particularly in a sub-freezing environment such as in the Arctic, where atmospheric temperatures are below the freezing point of water and/or where the permafrost may be encountered. In such regions, it may be necessary and/or desirable to use this fluid at temperatures below 32° F. Also, a method is described for drilling a well on rotating a drill bit to form a well bore and circulating in the well bore a drilling fluid which is the composition of the present invention, and recovering from the well bore cuttings such that a clean well bore is provided. This is particularly important where gravel and other unconsolidated materials are encountered.

VARIABLES OF THE INVENTION

The polysaccharides employed in preparing the fluids of the invention are heteropolysaccharides produced by the action of bacteria of the genus Xanthomonas on carbohydrates. Representative species of these bacteria which may be employed to produce the heteropolysaccharides include *Xanthomonas begoniae, Xanthomonas campestris, Xanthomonas carotae, Xanthomonas corylina, Xanthomonas gummisudans, Xanthomonas hederae, Xanthomonas incanae, Xanthomonas lespedezae, Xanthomonas malvacearum, Xanthomonas holcicola, Xanthomonas papavericola, Xanthomonas phaseoli, Xanthomonas pisi, Xanthomonas translucens, Xanthomonas vasculorum* and

*Xanthomonas vesicatoria*. Studies have shown that the production of the heteropolysaccharides is a characteristic trait of members of the genus Xanthomonas but that certain species of the genus produce the polymers with particular efficiency. Species which are outstanding in this respect include *Xanthomonas begoniae, Xanthomonas campestris, Xanthomonas incanae* and *Xanthomonas pisi*. These species are therefore preferred for the synthesis of the heteropolysaccharides.

The heteropolysaccharides employed in the present invention are produced as described in U.S. Pat. 3,243,000 and may be used in amounts within the range from about 0.05 to about 5.0% by wt. of the aqueous medium which may be sea water, other brine, fresh water or a drilling mud such as used in drilling oil and gas wells.

The muds used in drilling oil wells, gas wells and similar bore holes are generally aqueous liquids containing clays or other colloidal materials in substantial quantities. These colloidal constituents contribute to the viscosity and gel strength necessary for the entrainment and suspension of cuttings and weighting agents and assist in the formation of the filter cake needed for the reduction of fluid losses to the surrounding subsurface strata. It has been shown that excessive viscosity has an adverse effect on the penetration rates obtained and that substantially better rates can often be secured by eliminating the colloidal materials and using air, clear water or a similar fluid of low viscosity in place of ordinary mud. This is generally practical only in shallow wells where weighted fluids are not required, where the gel strength and fluid loss properties are not critical, and where no usual hole conditions are apt to be encountered. Various mud formulations intended to permit the satisfactory entrainment and suspension of solids and to provide the required filter cake without adversely affecting the drilling rate have been suggested from time to time but have generally not been successful. These drilling muds may not be satisfactorily used in sub-freezing environments because of the low temperatures encountered which may cause difficulties in circulation of the drilling mud and rotation of the drill bit. In fact, sub-freezing temperatures may solidify the mass.

The heteropolysaccharides are used in an amount within the range from 0.05 to about 5.0% by wt. of the aqueous medium; a preferred range is about 0.25 to 1.0% by wt. The oxygenated dispersants employed in the present invention are used in an amount within the range of about 1.0 to about 30% by wt. of the aqueous medium, but a range of about 5% to about 20% by wt. is preferred.

The oxygenated dispersants may suitably be a polyhydric alcohol such as ethylene glycol, diethylene glycol, triethylene glycol, propylene glycol, glycerol, 1,5-pentanediol, and the like. Other oxygenated dispersants include the ketones with acetone being preferred. Methyl ethyl ketone and other water soluble ketones may be used. As examples of other ketones may be mentioned diacetone alcohol, and the like. The low molecular weight aliphatic alcohols such as but not limited to methyl, ethyl, propyl, and isopropyl alcohols may also be used. Other useful oxygenated dispersants include diethyl ether, ethyl acetate, formaldehyde and other aldehydes and the like. As a general rule, oxygenated dispersants which are soluble in water and have a molecular structure similar to the structure of the heteropolysaccharide may be used as an oxygenated dispersant for the heteropolysaccharide in water and also lower the freezing point of the composition.

The heteropolysaccharides employed in the present invention may be used as such, but preferably the heteropolysaccharides are cross-linked. The heteropolysaccharides in aqueous solutions are cross-linked with a polyvalent metal cation selected from Groups III through VIII of the Periodic Table. Cross-linking agents employed are preferably water-soluble trivalent chromium compounds such as chromium bromide, chromium chloride, chromium nitrate, basic chromium sulfate, chromium ammonium sulfate, chromium potassium sulfate, and the like. Products on the market termed chrome-alum and organic chrome polymer give quite desirable results. The reaction may be carried out with other water-soluble compounds which yield polyvalent metal cations in aqueous solutions, such as aluminum chloride, ferric chloride, manganese dichloride, magnesium aluminum silicate and the like. While these materials may be used, they are less desirable because they are less effective than the water-soluble compounds of chromium referred to above. The methods and amounts used for preparing the cross-linked heteropolysaccharides are described in U.S. Pat. No. 3,243,000.

While the cross-linked heteropolysaccharides are preferred in the practice of the present invention, the heteropolysaccharides may also be used without cross-linking.

It is so contemplated that the fluids of the present invention may contain other materials besides the heteropolysaccharides either cross-linked or not, the oxygenated dispersant and the aqueous medium.

If used as preferred, the alkaline medium may be an aqueous solution of an alkali metal hydroxide such as sodium, potassium or lithium hydroxide. Sodium hydroxide is to be preferred, and the amount of alkaline medium employed may be sufficient to provide a pH in the fluid from about 8.0 to about 10.0.

It is to be realized that where the oxygenated dispersant is acidic, a sufficient amount of alkaline medium should be used to provide a pH of about 7 to 10.

The fluid of the present invention may contain other additives such as weighting agent, bactericides, gel forming materials and the like, all as set out more fully in U.S. Pat. No. 3,243,000.

It is desirable that the fluid of the present invention be prepared in a certain manner. Thus, the heteropolysaccharide in the amount given is added to the oxygenated dispersant. Thus, from about 0.25 to about 1.0% by wt. of the heteropolysaccharide is added to about 1.0 to 30% by wt. (both amounts based on the aqueous medium) of an oxygenated dispersant and the two components agitated or mixed for a time from about 0.25 to about 5 minutes to form a slurry which is then mixed with the aqueous medium which may be sea water at a temperature from about 28° F. to about 150° F. for a time within the range of about 15 to about 45 minutes to disperse the slurry in the aqueous medium. Optionally, an alkaline medium, preferably sodium hydroxide solution containing about 0.5 to about 5.0% by wt. NaOH is added to the aqueous medium containing the dispersed slurry to provide a pH within the range of about 8.0 to about 10.0. Thereafter, the fluid may be used as a drilling fluid in sub-freezing or Arctic environments with optional addition of other agents such as bactericides, weighting agents, colloidal materials such as bentonite and the like.

DESCRIPTION OF THE PREFERRED MODES AND EMBODIMENTS

In order to illustrate the present invention further, a typical drilling fluid which presents one example of a drilling liquid for use in a sub-freezing environment is made up as follows:

Add 3.5 pounds of Kelzan Type AL (XC-Polymer with chrome-alum cross-linking agent) to 20 pounds ethylene glycol and mix lightly for thirty seconds to form glycol-polymer slurry. The glycol-polymer slurry is then added to one 42-gallon barrel of cold sea water and agitated for 30 minutes and thereafter an aqueous solution of sodium hydroxide containing the equivalent of ⅓ pound of sodium hydroxide is added to the fluid to form a fluid of the present invention. This fluid has the following properties:

| | |
|---|---|
| pH | 8.5–9.1 |
| Freezing point °F | 15–20 |
| Plastic viscosity cp | 15–20 |
| Yield point lb./100 sq. ft. | 45–55 |

This fluid is a desirable fluid for use in Arctic drilling operations.

A bacteriacide such as paraformaldehyde may be added within a day or two to the fluid as a preservative.

Another typical drilling fluid in accordance with the present invention using .35% by weight of heteropolysaccharide may have the following characteristics:

| | |
|---|---|
| Yield point | 15–20 lb./100 sq. ft. |
| Plastic viscosity | 5–15 cp. |
| Mud weight | 9–10.5 p.p.g. |
| pH | 8–10. |
| Freezing point | 15–20° F. or lower. |

A fluid of these characteristics may contain about 5% or more by weight of ethylene glycol.

The heteropolysaccharide of the present invention may be suitably mixed by use of a mud gun or by introducing the components into a device which gives a moderate to high rate of shear. The oxygenated dispersant heteropolysaccharide slurry should be mixed only lightly.

In an operation in accordance with the present invention, a well bore was drilled using a drilling fluid in which initially 25 barrels of mud was mixed using 5.6% by wt. of ethylene glycol, 5.5% of gel (bentonite) and 0.5% of chrome-alum cross-linked heteropolysaccharide in an aqueous medium of sea water. The drilling fluid was circulated during the drilling operation with the result that the cuttings were carried out of the hole with the drilling fluid. The drilling operation was continued in which a slurry of about 3.5 pounds of chromium cross-linked heteropolysaccharide produced by *Xanthomonas campestris* polymer and about 20 pounds per barrel ethylene glycol was employed with sea water from the Beaufort Sea. Drilling operations were conducted on an island in the Beaufort Sea and during the drilling operations cores were taken at intervals. It was found during the drilling operations that the well bore at times during the coring operations would contain a considerable amount of gravel; however, on circulation of the drilling mud of the present invention, the hole was cleaned out and the cuttings were recovered.

In these operations, the drilling fluid performed satisfactorily in that good hole cleaning was achieved and there was no problem of drilling in the sub-freezing well bore environment. In short, the fluid of the present invention functioned in a desirable manner in Arctic operations during drilling on an island in the Beaufort Sea where temperatures in the well were as low as 15° F.

The nature and objects of the present invention having been completely described and illustrated and the best modes and embodiments contemplated set forth what I wish to claim as new and useful and secure by Letters Patent is:

1. A method for preparing a fluid for use in wells in subfreezing environments comprising an aqueous briny medium which consists essentially of:

adding an amount of heteropolysaccharide produced by the action of bacteria of the genus Xanthomonas on a carbohydrate within the range of about 0.05 to about 5.0% by wt. to an amount of about 1.0 to about 30% by weight of a liquid oxygenated hydrocarbon dispersant soluble in water and having a molecular structure similar to the structure of the heteropolysaccharide and having the property of lowering the freezing point of the fluid and being selected from the group consisting of unsubstituted aliphatic monohydric alcohols, polyhydric alcohols, aldehydes, ketones, diethyl ether and ethyl acetate, said amounts being based on the aqueous medium;

agitating said heteropolysaccharide and oxygenated dispersant for a time within the range from about 0.25 to about 5 minutes to form a slurry of said heteropolysaccharide and said oxygenated dispersant; and mixing said slurry with a major amount of the aqueous briny medium and agitating same for a time within the range of about 15 to about 45 minutes at a temperature from about 28° to about 150° F. to disperse said slurry in said aqueous medium.

2. A method in accordance with claim 1 in which the aqueous medium is sea water.

3. A method in accordance with claim 1 in which the aqueous medium is a drilling mud.

4. A method in accordance with claim 1 in which the oxygenated dispersant is a polyhydric alcohol selected from the group consisting of ethylene glycol, di-ethylene glycol, triethylene glycol, propylene glycol, glycerol, and 1,5-pentanediol.

5. A method in accordance with claim 1 in which the oxygenated dispersant is ethylene glycol.

6. A method in accordance with claim 1 in which the heteropolysaccharide is heteropolysaccharide produced by *Xanthomonas campestris*.

7. A method in accordance with claim 1 in which the heteropolysaccharide is cross-linked with a polyvalent metal cation selected from Groups III through VIII of the Periodic Table.

8. A method in accordance with claim 1 in which the heteropolysaccharide is cross-linked with a trivalent chromium compound.

9. A method in accordance with claim 1 in which the heteropolysaccharide is cross-linked with chrome-alum.

10. A method in accordance with claim 1 in which the heteropolysaccharide is further dispersed by the addition to the fluid of an amount of an alkaline medium sufficient to provide a pH in said fluid within the range of about 8 to about 10.

11. A method in accordance with claim 10 in which the alkaline medium is an aqueous solution of an alkali metal hydroxide.

12. A method in accordance with claim 1 in which:
(a) the oxygenated dispersant is a polyhydric alcohol selected from the group consisting of ethylene glycol, di-ethylene glycol, tri-ethylene glycol, propylene glycol, glycerol, and 1,5-pentanediol;
(b) the heteropolysaccharide is that produced by *Xanthomonas campestris*; and
(c) the aqueous medium comprises cold sea water.

13. A method in accordance with claim 12 in which the heteropolysaccharide is cross-linked with a polyvalent metal cation selected from Group III through Group VIII of the Periodic Table.

References Cited

UNITED STATES PATENTS

| | | | |
|---|---|---|---|
| 3,578,499 | 5/1971 | Crotty et al. | 252—132 X |
| 3,618,664 | 11/1971 | Harvey | 252—8.55 X |
| 3,243,000 | 3/1966 | Patton et al. | 252—8.5 X |
| 3,198,268 | 8/1965 | Lindblom et al. | 252—8.5 X |
| 3,179,528 | 4/1965 | Holmgren et al. | 106—90 |
| 3,634,237 | 1/1972 | Crenshaw et al. | 252—8.55 |

HERBERT B. GUYNN, Primary Examiner

U.S. Cl. X.R.

115—65; 252—8.5 A